(12) United States Patent
Kwaśniewski

(10) Patent No.: US 12,422,042 B2
(45) Date of Patent: Sep. 23, 2025

(54) BUTTERFLY VALVES

(71) Applicant: Hamilton Sundstrand Corporation, Charlotte, NC (US)

(72) Inventor: Paweł Kwaśniewski, Oława DS (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/351,673

(22) Filed: Jul. 13, 2023

(65) Prior Publication Data
US 2024/0035574 A1 Feb. 1, 2024

(30) Foreign Application Priority Data
Jul. 27, 2022 (EP) .................................. 22187354

(51) Int. Cl.
*F16K 1/226* (2006.01)
(52) U.S. Cl.
CPC .................................. *F16K 1/2261* (2013.01)
(58) Field of Classification Search
CPC ................................ F16K 1/2261; F16K 1/222
See application file for complete search history.

(56) References Cited

U.S. PATENT DOCUMENTS

| | | | | |
|---|---|---|---|---|
| 1,591,903 A | * | 7/1926 | White | F16K 1/2261 251/175 |
| 3,059,897 A | * | 10/1962 | Jensen | F16K 1/2261 251/308 |
| 3,260,502 A | * | 7/1966 | Plumer | F16K 1/2285 251/308 |
| 3,409,269 A | * | 11/1968 | Fawkes | F16K 1/2285 251/173 |
| 3,556,475 A | * | 1/1971 | Olenik | F16K 1/2261 277/637 |

(Continued)

FOREIGN PATENT DOCUMENTS

| | | |
|---|---|---|
| DE | 1228878 B | 11/1966 |
| DE | 102005010646 A1 | 9/2006 |

(Continued)

OTHER PUBLICATIONS

Abstract for DE102005010646 (A1), Published: Sep. 14, 2006, 1 page.

(Continued)

*Primary Examiner* — Umashankar Venkatesan
(74) *Attorney, Agent, or Firm* — CANTOR COLBURN LLP

(57) ABSTRACT

A valve disc for a butterfly valve. The valve disc includes a disc body, a main groove suitable for receiving a seal element, and an introduction groove. The disc body comprises first and second faces, an outer periphery, and at least one engagement means configured to receive a shaft for coupling the valve disc to a valve body of the butterfly valve. The main groove extends along the outer periphery to form a continuous groove. The introduction groove has a centreline (CL2) and extends from a groove mouth opening in one of the faces of the disc body to an intersection with the main groove. The main groove is so dimensioned and configured that a seal element can only be inserted into or removed from the main groove via the introduction groove. Optionally, the valve disc is a single continuous body of material.

18 Claims, 5 Drawing Sheets

(56) References Cited

U.S. PATENT DOCUMENTS

| | | | | |
|---|---|---|---|---|
| 3,734,457 | A * | 5/1973 | Roos | F16K 1/2285 |
| | | | | 251/173 |
| 3,910,555 | A | 10/1975 | Bertrem et al. | |
| 4,632,360 | A | 12/1986 | Desalve | |
| 4,899,984 | A | 2/1990 | Strickler et al. | |
| 4,998,708 | A | 3/1991 | Pavanel | |
| 5,326,077 | A | 7/1994 | Spencer et al. | |
| 5,741,006 | A | 4/1998 | Murai et al. | |
| 6,189,860 | B1 * | 2/2001 | Sato | F16K 1/2263 |
| | | | | 251/305 |
| 7,165,772 | B1 * | 1/2007 | Camacho | F16J 9/14 |
| | | | | 277/496 |
| 8,276,880 | B2 * | 10/2012 | Kolb | F16K 1/2261 |
| | | | | 251/306 |
| 8,727,312 | B2 | 5/2014 | Lockwood et al. | |
| 10,378,655 | B2 * | 8/2019 | Ishigaki | F02M 26/54 |
| 10,428,955 | B2 * | 10/2019 | Dehais | F16K 1/222 |
| 10,584,796 | B2 * | 3/2020 | Hielkema | F16K 1/205 |
| 11,085,543 | B2 * | 8/2021 | Tsuzuki | F02D 9/1015 |
| 2010/0006788 | A1 * | 1/2010 | Tanner | F16K 1/2261 |
| | | | | 251/65 |
| 2018/0224001 | A1 * | 8/2018 | Malik | F16K 1/222 |

FOREIGN PATENT DOCUMENTS

| | | |
|---|---|---|
| DE | 102019110752 B3 | 3/2020 |
| WO | 2020178756 A1 | 9/2020 |

OTHER PUBLICATIONS

Abstract of DE102019110752 (B3), Published: Mar. 26, 2020, 1 page.

European Search Report for Application No. 22187354.0, mailed Jan. 10, 2023, 10 pages.

* cited by examiner

BUTTERFLY VALVES

CROSS REFERENCE TO RELATED APPLICATION

This application claims priority to European Patent Application No. 22187354.0 filed Jul. 27, 2022, the entire contents of which is incorporated herein by reference.

TECHNICAL FIELD

This disclosure relates to butterfly valves and in particular to butterfly valves having a ring seal.

BACKGROUND

Butterfly valves are used in a wide variety of applications to control the flow of fluids. A butterfly valve typically has a valve disc arranged in the flow of the fluid. The valve disc rotates between an open position where fluid flows and a closed position against a valve seat where fluid flow is stopped. A seal element, for example a ring seal, is typically arranged about an outer periphery of the valve disc, and the seal element engages the valve seat to prevent the flow of fluid when the valve disc is in a closed position. Typically the seal element, where present, is loosely engaged with the outer periphery of the valve disc. This assists in minimising friction in the operation of the butterfly valve.

SUMMARY

According to a first aspect of the present disclosure there is provided a valve disc for use in a butterfly valve in which the valve disc includes a disc body, a main groove suitable for receiving a seal element, and an introduction groove. The disc body includes first and second faces, an outer periphery, and at least one engagement means configured to engage with a shaft for coupling the valve disc to a valve body of the butterfly valve. The main groove extends along the outer periphery to form a continuous groove. The introduction groove has a centreline and extends from a groove mouth opening in one of the faces of the disc body to an intersection with the main groove. The main groove is so dimensioned and configured that a seal element can only be inserted into or removed from the main groove via the introduction groove. Optionally, the valve disc is a single continuous body of material.

In an embodiment of the above embodiment, the outer periphery of the valve disc is a cylindrical surface about an axis A, and the cylindrical surface extends between the first and second faces of the valve disc.

In an embodiment of any of the above embodiments, the main groove extends both into the body of the valve disc from the outer periphery, and across the surface of the outer periphery in a direction circumferentially around axis A.

In an alternative embodiment of any of the above embodiments, the main groove is so positioned on the outer periphery of the valve disc that, when the valve disc is incorporated into a butterfly valve, a seal element located in the main groove is located so as to form a seal with the valve seat of the valve when the valve disc is in the closed position.

The main groove is continuous because it has no beginning or end.

In an embodiment of any of the above embodiments, the introduction groove mouths into a side of the main groove and as such does not disrupt the continuous nature of the main groove.

In an embodiment of any of the above embodiments, at least one of the engagement means is a socket into which an end of a shaft may be inserted.

In an embodiment of any of the above embodiments, at least one of the engagement means is adapted to grip a shaft.

In an embodiment of any of the above embodiments, the introduction groove extends both from the outer periphery into the body of the valve disk, and from one of the first and second faces of the valve disk to the main groove.

In an embodiment of any of the above embodiments, the introduction groove intersects the main grove at an included angle (the angle between the centreline of the main groove and the centreline of the introduction groove) that is less 80 degrees and greater than 5 degrees. In some embodiments the included angle is between 10 degrees and 45 degrees.

In an embodiment of any of the above embodiments, the main groove is so dimensioned and configured that a suitable seal element located in the main grove cannot be removed from the main groove in a direction that is not substantially parallel to the outer periphery without causing damage to one or both of the seal element and the valve disc. The introduction groove extends in a direction that is substantially parallel to the outer periphery and allows the seal element to be removed from the main groove by an end of the seal element being moved out of the main groove and into the introduction groove, along the introduction groove, and out of the face of the valve disc through which the end of the introduction groove mouths. Introduction of the seal element into the main groove is the reverse of the removal process.

Valve discs where the seal element cannot be removed from the main groove in a direction that is not substantially parallel to the outer periphery without causing damage to one or both of the seal element and the valve disc are known. In such known valve discs the valve disc is formed from multiple elements, typically first and second disc plates which are reversibly secured to each other by a plurality of fixing means. The fixing together of the first and second disc plates forms the main groove between the disc plates. A seal element is placed between the first and second disc plates before they are fixed to each other. The seal element is trapped in the main groove once the first and second disc plates are fixed to each other.

To construct such known valve discs, or to reconstruct the known valve disc following replacement of the seal element, is a task which is a delicate and time consuming operation. This is because the first and second disc plates and seal element need to be placed together loose, and the fixing means then used to fix the first and second disc plates to each other with the seal element exactly in the position which will be the main groove. If the first and second disc plates are fixed together with the seal element in the incorrect position there is a risk of damage to one or more of the first and second disc plates and the seal element. The fixing means all need to be tightened or restrained from movement when the known valve disc is constructed. The tightening or fixing needs to be such that the fixing means do not loosen when the butterfly valve is in use, and also that they do not distort or damage the first and/or second disc plates.

The valve disc of the present disclosure is a single continuous body of material, that is the valve disc is formed from one piece of material and the seal element is placed into or removed from the main groove in the fashion described above. This is advantageous relative to the known valve discs because the construction of the valve disc and seal element is simpler and faster than the construction of known valve disc and seal elements. Further, the valve disc and seal element of the present disclosure are lighter than the known valve disc and seal element. Still further, the valve disc and seal element are less likely to be damaged than the known valve disc and seal element.

In an embodiment of any of the above embodiments, a cross-section of the main groove in a plane perpendicular to the direction in which the main groove extends (the direction of the centreline of the main groove) is one of a shape such that the seal element cannot be pulled out of the main groove other than in a direction along the centreline of the introduction groove, approximately L shaped, approximately V shaped, approximately T shaped, or approximately Y shaped. The centrelines of the main and introduction grooves are the lines formed by the joining of the geometric centres of cross-sections of those grooves respectively.

In an embodiment of any of the above embodiments, the seal element for use with the valve disc of the present disclosure in a plane perpendicular to the direction in which the seal element extends is one of a shape that cannot be pulled out of the main groove other than in a direction along the centreline of the introduction groove, approximately L shaped, approximately V shaped, approximately T shaped, or approximately Y shaped.

In an embodiment of any of the above embodiments, the introduction groove has a cross-section in a plane perpendicular to the centreline of the introduction groove that is rectangular, circular, the shape of a major segment of a circle, the shape of a minor segment of a circle, or the shape of a sector of a circle.

In an alternative embodiment of any of the above embodiments, the introduction groove has a cross-section in a plane perpendicular to the centreline of the introduction groove that is one of a shape such that the seal element cannot be pulled out of the introduction groove other than in a direction along the centreline of the introduction groove, approximately L shaped, approximately V shaped, approximately T shaped, or approximately Y shaped.

In an embodiment of any of the above embodiments, the introduction groove has the same or approximately the same cross-section in a plane perpendicular to the centreline of the introduction groove as the cross-section of the main groove in a plane perpendicular to the centreline of the main groove.

In an embodiment of any of the above embodiments, one of the engagement means is so positioned and orientated that a shaft located in that engagement means intersects the centreline of the introduction groove. An advantage of such an arrangement is that the when the shaft is located in the engagement means, for example when the butterfly valve is in use, an end of the seal element, if it were to start to exit the main groove along the introduction groove will move until that end of abuts the shaft and is then inhibited from further exiting the main groove by the shaft.

In an embodiment of any of the above embodiments, the shaft located in the engagement means substantially blocks the groove mouth of the introduction groove. This is advantageous because it minimises the distance out of the main groove an end of the seal element can travel. A further advantage is that the blocking of the mouth of the introduction groove prevents the end of the seal element deflecting around the shaft.

In an embodiment of any of the above embodiments, the valve disc further comprises a seal element in which the seal element is loosely retained in the main groove.

In an embodiment of any of the above embodiments, the seal element comprises one of polytetrafluoroethylene (PTFE), a composite material containing a carbon material, a plastics material, a low friction material, a metallic material, or a mixture of two or more of the aforesaid materials.

In an embodiment of any of the above embodiments, the composite material containing a carbon material is a matrix including one or more of carbon fibres, flakes of graphene, or other carbon nanostructures.

In an embodiment of any of the above embodiments, the seal element is longitudinally extending, and the length of the seal element is equal to or shorter than the length of the main groove at a position in the main groove furthest from the outer perimeter of the valve disc. In some embodiments the length of the seal element and main groove is measured at 20 degrees centigrade.

In an embodiment of any of the above embodiments, the length of the seal element is, when measured at the expected maximum operating temperature of the butterfly valve the seal element is to be used in, approximately equal to the length of the main groove at a position in the main groove furthest from the outer perimeter of the valve disc. This is advantageous because the seal element provides maximum sealing at he expected operating temperature of the butterfly valve.

According to a second aspect of the present disclosure there is provided a butterfly valve comprising a valve disc according to the first aspect of the present disclosure.

According to a third aspect of the present disclosure there is provided a method of manufacture of a valve disc according to the first aspect of the present disclosure comprising forming the valve disc, and preparation of the valve disc for use in a butterfly valve, in which the valve disc is formed by one of an additive manufacturing process, casting and subsequent machining of the valve disc, or moulding and subsequent machining of the valve disc.

In an embodiment of any of the above embodiments, the forming of the valve disc is performed by an additive manufacturing process. Additive manufacturing processes are often generally and collectively known as 3-D printing. In such embodiments the material from which the valve disc is formed may be any material that is suitable for both the conditions expected to be experienced by the butterfly valve in which the valve disc is to be used, and for use in the additive manufacturing process to be used. In some embodiments the additive manufacturing process is one of a vat polymerisation process, a material jetting process, a binder jetting process, a fuse deposition modelling process, a powder bed fusion process, or a directed energy deposition (DED) process. An advantage of the use of an additive manufacturing process is that the nature of the process allows the valve disc as a whole including the main and introduction grooves to be formed with no or minimal machining of the valve disc after the additive manufacturing process.

In an embodiment of any of the above embodiments, the formation of the valve disc comprises use of an additive manufacturing process followed by some machining of the valve disc. For example turning, milling, drilling, cutting, boring, reaming or grinding of at least part of the valve disc.

In an alternative embodiment of any of the above embodiments, the forming of the valve disc is performed by casting and subsequent machining of the valve disc. In some embodiments the material from which the valve disc is formed is a metal or metal alloy. The machining subsequent machining may, in particular, be to form or finish of the main groove and/or the introduction groove. The machining may, for example include turning, milling, drilling, cutting, boring, reaming or grinding of the valve disc.

In an alternative embodiment of any of the above embodiments, the forming of the valve disc is performed by moulding and subsequent machining of the valve disc. In some embodiments the material from which the valve disc is formed is a plastic or liquid composite material which sets during the moulding process. The subsequent machining may, in particular, be to form or finish the main groove and/or the introduction groove. The machining may, for example include turning, milling, drilling, cutting, boring, reaming or grinding of the valve disc.

In an embodiment of any of the above embodiments, the preparation of the valve disc comprises providing a seal element, introducing a lead end of the seal element into the introduction groove, advancing the lead end of the seal element along the along the introduction groove and into the main groove, advancing the lead end of the seal element along the main grove until a tail end of the seal element moves along the introduction groove and enters the main groove.

According to a fourth aspect of the present disclosure there is provided a method of manufacture of a butterfly valve comprising providing a valve body, a valve disc according to the first aspect of the present disclosure, and at least one shaft; the method comprising placing the valve disc in the valve body; engaging at least one shaft and an engagement means on the valve disc; and coupling the valve disc to the valve body via the at least one shaft.

In an embodiment of any of the above embodiments, one of the at least one shafts intersects the centreline of the introduction groove of the valve disc.

In an embodiment of any of the above embodiments, one of the at least one shafts substantially blocks the groove mouth of the introduction groove of the valve disc.

According to a fifth aspect of the present disclosure there is provided a method of repair of a butterfly valve comprising a valve body, a valve disc according to the first aspect of the present disclosure, and at least one shaft. The method includes: de-coupling the valve disc from the valve body which includes disengaging the engaging means of the valve disc and the shaft that intersects the centreline of the introduction groove; moving an end of the seal element along the main groove until it reaches the intersection of the main groove and the introduction groove; moving the end of the seal element along the introduction groove; continuing to move the seal element in the same direction until it has completely left the main groove and introduction groove; moving an end of a new seal element along the introduction groove towards the intersection with the main groove; moving the end of the new seal element along the main groove until the other end of the new seal element enters the main groove; and coupling the valve disc to the valve body via the at least one shaft which includes engaging at least one shaft with an engagement means on the valve disc.

BRIEF DECRIPTION OF THE DRAWINGS

The present disclosure will be further described and explained by way of example with reference to the accompanying drawings in which.

DETAILED DESCRIPTION

Figure 1:
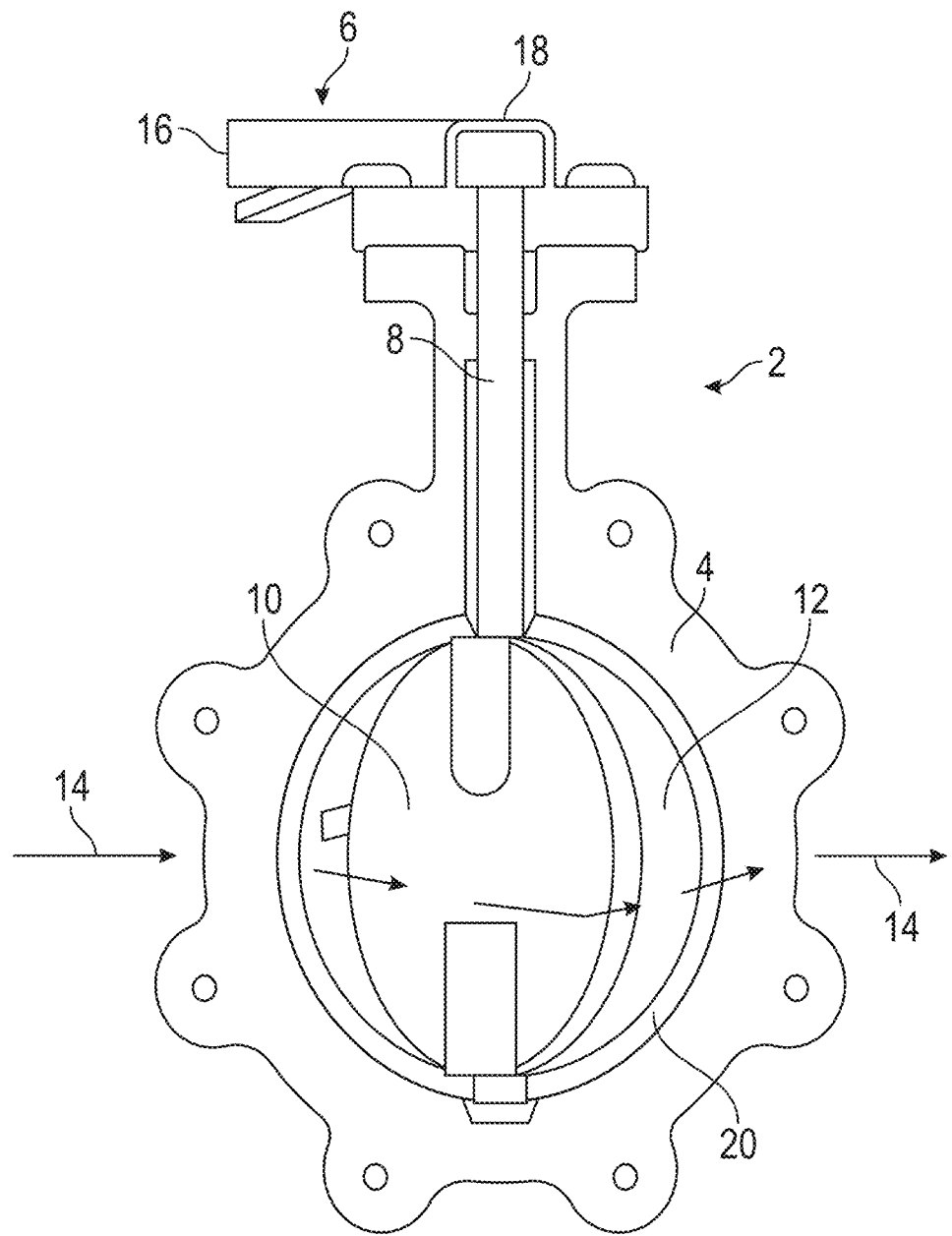
FIG. 1 shows a schematic view of an embodiment of a butterfly valve according to the present disclosure.
Figure 2:
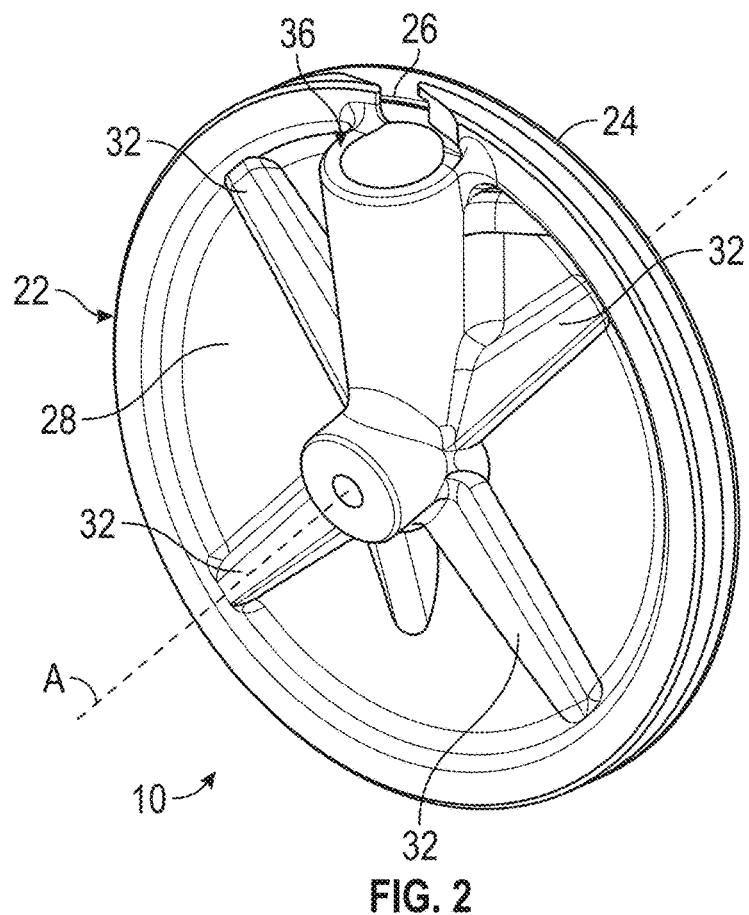
FIG. 2 shows a schematic perspective view of an embodiment of a valve disc according to the present disclosure.
Figure 3:
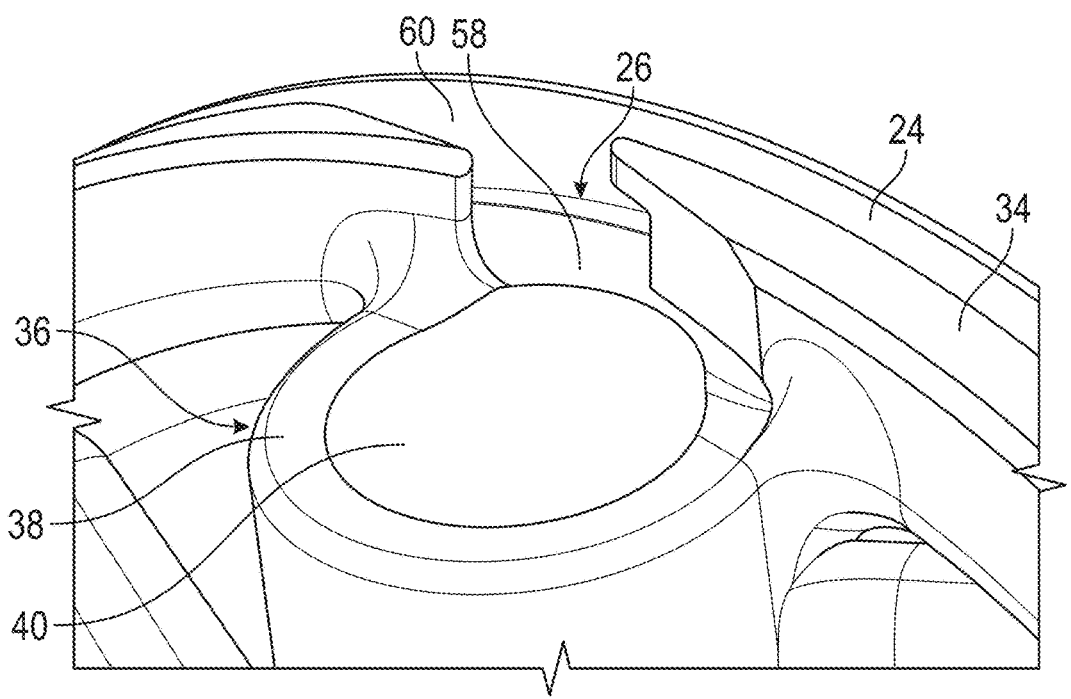
FIG. 3 shows a first enlarged view of part of the valve disc of FIG. 2.
Figure 4:
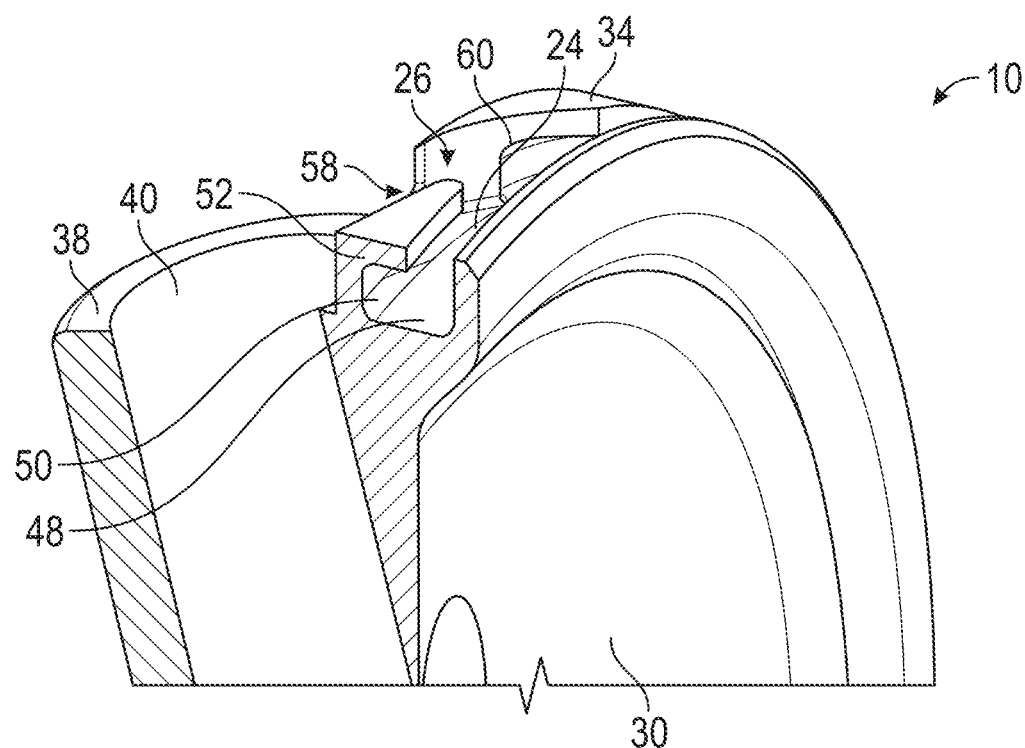
FIG. 4 shows a second enlarged and partially sectioned view of the valve disc of FIG. 2.
Figure 5:
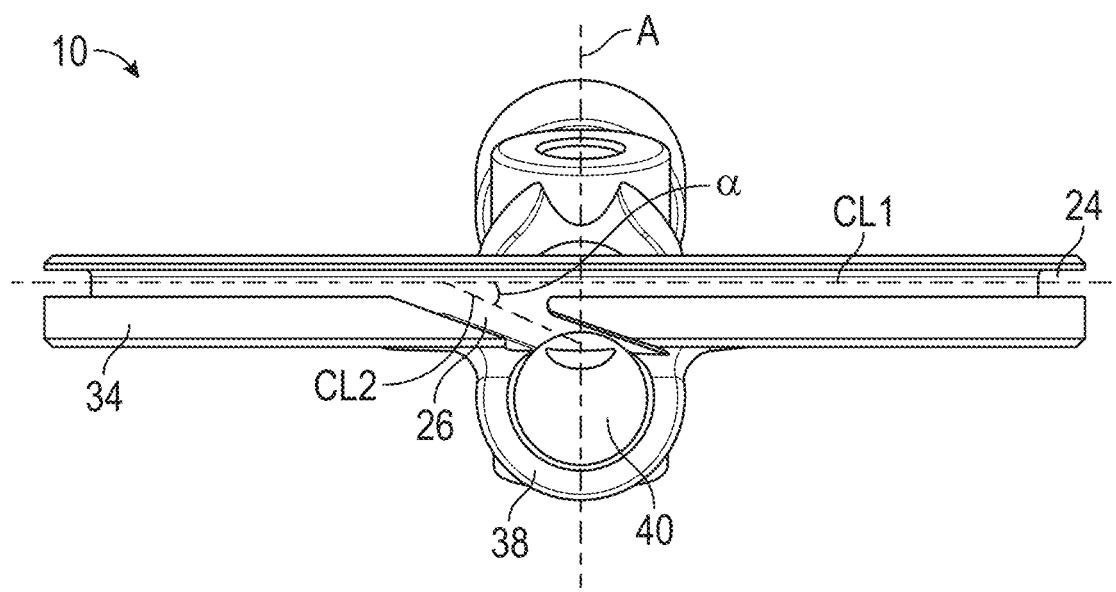
FIG. 5 shows a side view of the valve disc of FIG. 2.

With reference to FIG. 1, a valve 2 includes a valve body 4 and a control device 6. The valve body 4 includes an interior passage 12 through which the fluid 14 flows. The control device 6 has the form of an arm with a first end 16 which is engaged with an actuator (not shown), and a second end 18 which is connected or coupled via a shaft 8 to a valve disc 10. The valve disc 10 is coupled to the valve body 4 and may rotate within the interior passage 12 between an open position where the fluid 14 flows and a closed position where the valve disc assembly 10 engages a valve seat or the bore 20 of the valve body 4 to block the flow of fluid 14.

With reference to FIGS. 2 to 5, the valve disc 10 includes a disc body 22, a main groove 24, and an introduction groove 26.

The disc body 22 is circular around an axis A, and includes first and second faces 28, 30, an outer periphery 34, four ribs 32, and at least one engagement means 36. All reference hereafter to axially, radially, circumferentially, cylindrical or similar terminology relates to axis A unless otherwise specified.

The outer periphery 34 forms a cylindrical face extending around the axis A and extends between the radially outermost edges of the first and second faces 28, 30 of the disc body 22. The main groove 24 extends both circumferentially around the disc body 22, and radially into the disc body 22 from the outer periphery 34. The main groove 24 has a centreline CL1 which also extends circumferentially around the disc body 22. The main groove 24 is continuous in that it has no beginning or end because it extends circumferentially around the disc body 22.

The introduction groove 26 extends both between the first face 28 of the disc body 22 and the main groove 24 and radially into the disc body 22 from the outer periphery 34. The introduction groove 26 has a centreline CL2 which intersects the centreline CL1 of the main groove 24 at an included angle α of around 20 degrees. The included angle α is such that the seal element can elastically flex or bend so that it can move (in either direction) between the introduction groove and the main groove.

The ribs 32 extend radially across one or both of the first and second faces 28, 30 and stiffen the disc body 22. There are four ribs 32 shown in FIG. 2. In other embodiments there may be more or less ribs 32. The number of ribs may be selected in light of one or more of the forces the disc body 22 is expected to experience when part of a butterfly valve 2 that is in use, and the material from which the valve disc 22 is formed.

The engagement means 36 are configured to reversibly engage with the shaft 8. In the illustrated embodiment the engagement means is formed from a socket wall 38 which at least partially defines a socket 40. The socket 40 is dimensioned and configured to releasably receive an end of the shaft 8. In the illustrated embodiment the shaft 8 is cylindrical and has a longitudinal shaft axis about which the cylindrical face of the shaft 8 extends.

The valve disc 10 is a single continuous body of material. The valve disc 10 is, in the illustrated embodiment, formed by use of an additive manufacturing technique. This is advantageous because it allows the formation of the valve disc 10 as a whole and can allow such formation not to require any machining steps after the additive manufacturing technique has been concluded. Further, as discussed below, the main groove 24 has a shape that can be complex to manufacture at small scales. The use of additive manufacturing techniques can overcome those complexities and can result in more economic and quicker manufacture.

In alternative embodiments, the body can be formed using known casting or moulding techniques and subsequently machined to achieve the desired configuration.

Figure 6:
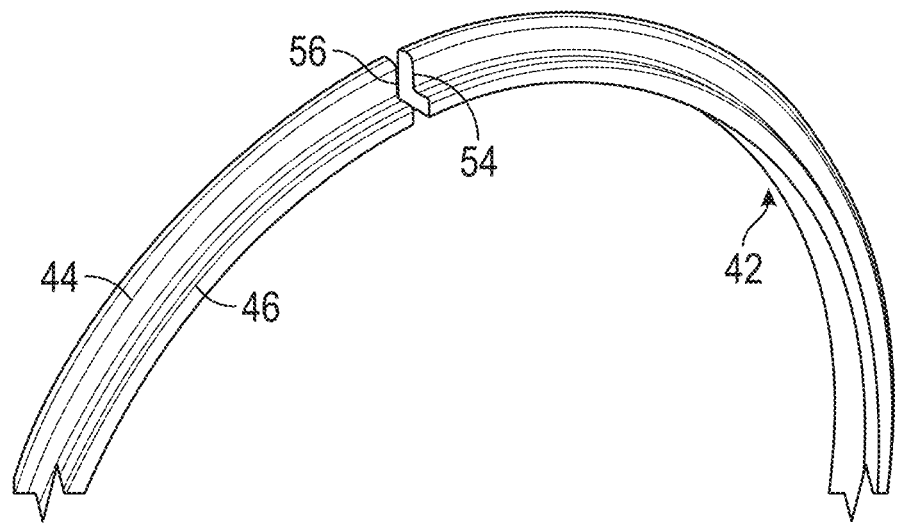
FIG. 6 shows a perspective view of a seal element for use with the valve disc of FIG. 2.
Figure 7:
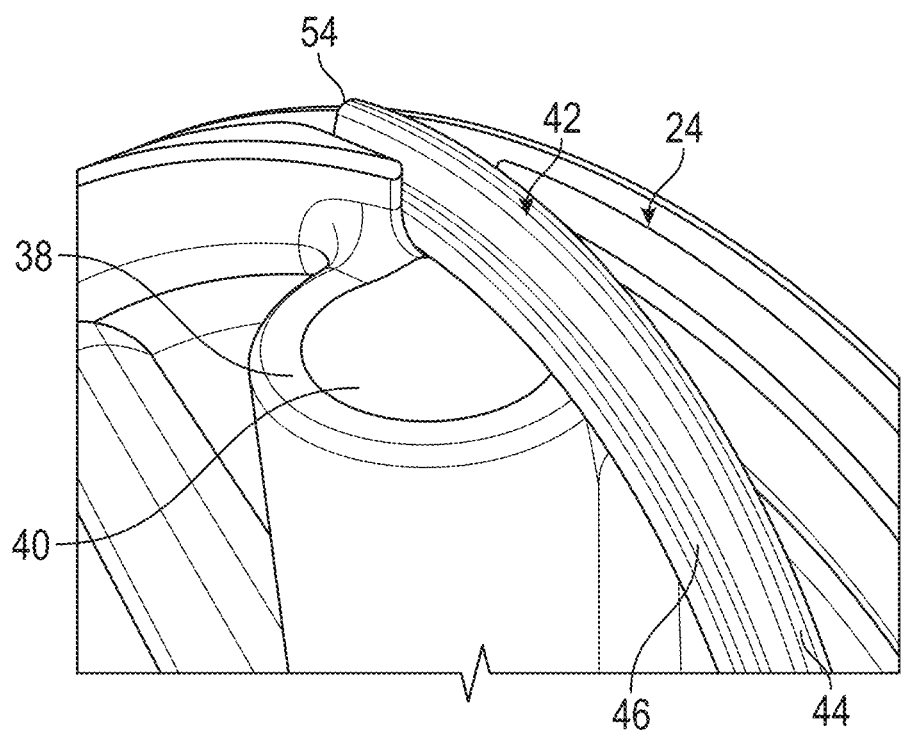
FIG. 7 shows a schematic perspective view of part of the seal element of FIG. 6 being introduced into the valve disc of FIG. 2.
Figure 8:
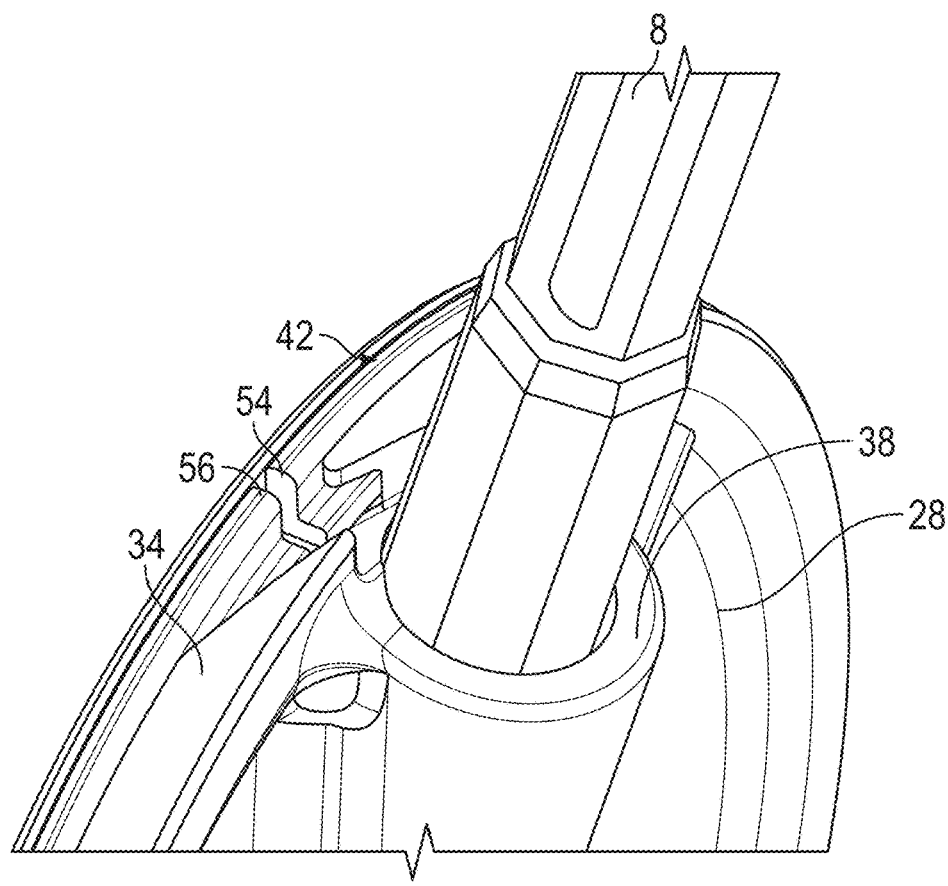
FIG. 8 shows a first schematic perspective view of part of the seal element of FIG. 6 when fully introduced into the valve disc of FIG. 2.
Figure 9:
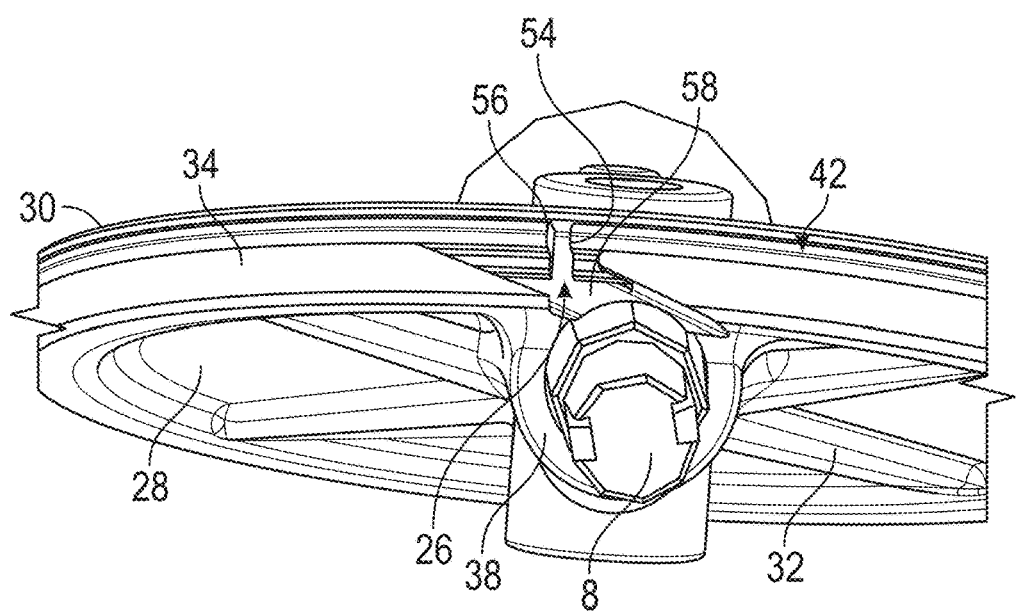
FIG. 9 shows a second schematic perspective view of part of the seal element of FIG. 6 when fully introduced into the valve disc of FIG. 2.

With reference to FIG. 6 and with further reference to FIGS. 1 to 5, the main groove 24 is so dimensioned and configured that a seal element 42 can only be inserted into or removed from the main groove 24 via the introduction groove 26. In the illustrated embodiment the cross section of the main groove in the plane perpendicular to the main grove centreline CL1 is approximately of the same cross section as the seal element 42 in the plane perpendicular to the longitudinal extent of the seal element 42.

In the illustrated embodiment, the seal element 42 is has an L shaped cross section made up of a stem 44 and a horizontal bar 46. The seal element is manufactured to extend longitudinally in an approximate ring shape which approximately matches the diameter of the main groove 24. The seal element 42 has first and second ends 54, 56. The length of the seal 42 between the first and second ends 54, 56 is equal to or less than the length of the main groove 24. The length may be measured at the expected operational temperature of the butterfly valve 2 in which the seal element 42 and valve body 4 are to be used or at a predetermined temperature such as 20 degrees centigrade. The first and second ends 54, 56 of the seal element 42 are configured so that they are approximately parallel to each other when the seal element is located in the main groove 42.

The main groove 24 has a radial portion 48 through which a portion of the stem 44 of the seal element 42 may extend, and an axial portion 50 which can receive the horizontal bar 46 of the seal element 42. When the seal element is located in the main groove 24, the shoulder 52 that is between the axial portion 50 of the main groove 24 and the outer periphery 34 blocks the horizontal bar 46 of the seal element 42 from moving out of the main groove 24 in direction that includes a radial vector.

The seal element 42 and main grove 24 are both so dimensioned and configured that the seal element 42 is loosely retained in the main groove 24. This has the result that the seal element 42 may move along the main grove 24. This has a effect of reducing wear of and the likelihood of damage to the seal element 42.

The seal element 42 comprises one of polytetrafluoroethylene, a composite material containing a carbon material, a plastics material, a low friction material, a metallic material, or a mixture of two or more of the aforesaid materials. The seal element 42 is formed from a material that allows the seal element 42 to elastically deform sufficiently for the stem 44 of the seal element to deform to form a seal against the bore 20 of the butterfly valve 2, and to allow the seal element 42 to be flexed or curved in a direction lateral to the centreline CL1 of the seal element sufficiently for the seal element 42 to pass along the introduction groove 26 and into the main groove 42.

With further reference to FIGS. 2 to 5, the introduction groove 26 has a rectangular cross-section in a plane perpendicular to the centreline CL2 of the introduction groove 26. The introduction groove 26 is so dimensioned in directions perpendicular to the centreline CL2 that he seal element 42 may pass along it.

The introduction groove 26 extends from an outer mouth 58 to an inner mouth 60. The outer mouth 58 opens through a portion of the first face 28 of the disc body 22. The inner mouth 60 is formed at the intersection of the introduction groove 26 and the main groove 24. The inner mouth 60 may be referred to as intersection 60 because it is the intersection between the main groove 24 and the introduction groove 26.

The outer mouth 58 of the induction groove 26 is so located that the radially innermost edge of the outer mouth 58 is common with an edge of a portion of the disc body 22 that partially defines socket 40. As a result, when an end of the shaft 8 is inserted into the socket 40, the shaft 8 at least partially blocks the outer mouth 58 of the introduction groove 26 and the centreline CL2 intersects the shaft 8.

An example of a method of manufacture of as butterfly valve 2 is as follows:

A valve body 4 with a bore 20 is manufactured using conventional techniques.

A valve disc 10 is formed using an additive manufacturing process. In other embodiments the valve disc is formed using a casting process and subsequent machining of the valve disc, or a moulding process and subsequent machining of the valve disc.

A seal element 42 of an appropriate length is provided.

The first end 54 of the seal element 42 is placed into the introduction groove 26 and the portion of the seal element 42 immediately adjacent the first end 54 is laid along the introduction groove so that the seal element extends through the outer mouth 58 of the introduction groove 26. The first end 54 of the seal element 42 is advanced along the along the introduction groove 26 until it passes through the inner mouth 60 of the introduction groove 26 and into the main groove 24.

The first end 54 of the seal element 42 is deflected and a curve formed in the seal element 42 as the seal element 42 passes into and then along the main groove 24. The first end 54 of the seal element 54 is moved along the main grove 24 until the second end 56 of the seal element 42 moves along the introduction groove 26 and enters the main groove 24.

The shaft 8 is introduced into the socket 40 and the seal element 42 is blocked from working itself out of the main groove 24 over time because if the second end 56 of the seal element 42 were to re-enter the introduction groove 26 through its inner mouth 60 the second end 56 would impact the shaft 8 and be prevented from further movement away from the disc body 22.

The valve disc 10 is then coupled to the valve body 4 via the shaft 8. The control device 6 is then fixed to the end of the shaft 8 remote from the socket 40. The butterfly valve 2 is then ready for use.

After the butterfly valve 2 has been in use, it may be necessary to replace the seal element 42. The method of replacing the seal includes de-coupling the valve disc 10 from the valve body 4 which includes disengaging the shaft 8 from the socket 40;

moving the second end 56 of the seal element 42 along the main groove 24 until it reaches the inner mouth 60 of the introduction groove 26;

moving the second end 56 of the seal element 42 along the introduction groove 26 and through the outer mouth 58 of the introduction groove 26;

continuing to move the second end 56 of the seal element 42 in the same direction until the seal element 42 has completely left the main groove 24 and introduction groove 26;

moving a first end 54 of a new seal element 42 along the introduction groove 26 towards the inner mouth 60 of the introduction groove 26 and into the main groove 24;

moving the first end 54 of the new seal element 42 along the main groove 24 until the second end 56 of the new seal element 42 enters the main groove 24; and coupling the valve disc 10 to the valve body 4 via the shaft 8 which includes engaging the shaft 8 with the socket 40.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the butterfly valves and the parts thereof disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A valve disc for a butterfly valve, the valve disk comprising: a disc body, wherein the disc body comprises: first and second faces; an outer periphery; at least one engagement means configured to receive a shaft for coupling the valve disc to a valve body of the butterfly; a main groove suitable for receiving a seal element, wherein the main groove extends along the outer periphery to form a continuous groove; and an introduction groove, wherein the introduction groove has a centreline (CL2) and extends from a groove mouth opening in one of the faces of the disc body to an intersection with the main groove; wherein the main groove is shaped so that the seal element can only be inserted into or removed from the main groove via the introduction groove; wherein a cross-section of the main groove in a plane perpendicular to the direction in which the main groove extends (CL1) is a shape such that the seal element cannot be pulled out of the main groove other than in a direction along the centreline (CL2) of the introduction groove.

2. A valve disc according to claim 1, wherein the valve disc is a single continuous body of material.

3. A valve disc according to claim 1, wherein a cross-section of the main groove in a plane perpendicular to the direction in which the main groove extends (CL1) is L shaped, V shaped, T shaped, or Y shaped.

4. A valve disc according to claim 1, wherein the introduction groove has a cross-section in a plane perpendicular to the centreline (CL2) of the introduction groove that is a shape such that the seal element cannot be pulled out of the main groove other than in a direction along the centreline (CL2) of the introduction groove.

5. A valve disc according to claim 1, wherein the introduction groove has a cross-section in a plane perpendicular to the centreline (CL2) of the introduction groove that is L shaped, y V shaped, T shaped, or Y shaped.

6. A valve disc according to claim 1, wherein one of the engagement means is so positioned and orientated that a shaft located in that engagement means intersects the centreline (CL2) of the introduction groove.

7. A valve disc according to claim 6, wherein the shaft located in the engagement means at least partially blocks the groove mouth of the introduction groove.

8. A valve disc according to claim 1, further comprising: the seal element retained in the main groove.

9. A valve disc according to claim 8, wherein the seal element comprises one of polytetrafluoroethylene, a composite material containing a carbon material, a plastics material, a low friction material, a metallic material, or a mixture of two or more of the aforesaid materials.

10. A valve disc according to claim 8, wherein the seal element is longitudinally extending, and the length of the seal element is equal to or shorter than the length of the main groove at a position in the main groove furthest from the outer periphery of the valve disc.

11. A butterfly valve comprising:
a valve disc according to claim 1.

12. A method of manufacture of a valve disc according to claim 1, the method comprising;
forming the valve disc,
preparing the valve disc for use in a butterfly valve;
wherein the valve disc is formed by one of an additive manufacturing process, casting and subsequent machining of the valve disc, or moulding and subsequent machining of the valve disc.

13. A method of manufacture of a valve disc according to claim 12, wherein preparing the valve disc comprises providing a seal element, introducing a lead end of the seal element into the introduction groove, advancing the lead end of the seal element along the introduction groove and into the main groove, advancing the lead end of the seal element along the main groove until a tail end of the seal element moves along the introduction groove and enters the main groove.

14. A valve disc for a butterfly valve, the valve disk comprising:
a disc body, wherein the disc body comprises:
first and second faces;
an outer periphery;
at least one engagement means configured to receive a shaft for coupling the valve disc to a valve body of the butterfly;
a main groove suitable for receiving a seal element, wherein the main groove extends along the outer periphery to form a continuous groove; and
an introduction groove, wherein the introduction groove has a centreline (CL2) and extends from a groove mouth opening in one of the faces of the disc body to an intersection with the main groove;

wherein the main groove is shaped so that the seal element can only be inserted into or removed from the main groove via the introduction groove;

wherein the centreline (CL2) of the introductory groove intersects the main groove at an included angle (α) of between one of 5 degrees and 80 degrees.

15. A valve disc according to claim 14, wherein a cross-section of the main groove in a plane perpendicular to the direction in which the main groove extends (CL1) is a shape such that the seal element cannot be pulled out of the main groove other than in a direction along the centreline (CL2) of the introduction groove.

16. A valve disc according to claim 14, wherein a cross-section of the main groove in a plane perpendicular to the direction in which the main groove extends (CL1) is L shaped, V shaped, T shaped, or Y shaped.

17. A method of manufacture of a butterfly valve comprising:

providing a valve body, providing a valve disc, the valve disc comprising: a disc body, wherein the disc body comprises: first and second faces; an outer periphery; at least one engagement means configured to receive a shaft for coupling the valve disc to a valve body of the butterfly; a main groove suitable for receiving a seal element, wherein the main groove extends along the outer periphery to form a continuous groove; an introduction groove, wherein the introduction groove has a centreline (CL2) and extends from a groove mouth opening in one of the faces of the disc body to an intersection with the main groove, wherein the main groove is shaped so that the seal element can only be inserted into or removed from the main groove via the introduction groove; and the seal element retained in the main groove; providing at least one shaft; placing the valve disc in the valve body; engaging the at least one shaft and an engagement means on the valve disc; and coupling the valve disc to the valve body via the at least one shaft; wherein one of the at least one shafts intersects the centreline (CL2) of the introduction groove of the valve disc.

18. A method according to claim 17, wherein one of the at least one shafts substantially blocks the groove mouth of the introduction groove of the valve disc.

* * * * *